(12) United States Patent
Constantin et al.

(10) Patent No.: US 7,154,622 B2
(45) Date of Patent: Dec. 26, 2006

(54) METHOD OF ROUTING AND PROCESSING DOCUMENT IMAGES SENT USING A DIGITAL SCANNER AND TRANSCEIVER

(75) Inventors: Michael Constantin, Irvine, CA (US); Mark Liu Stevens, Orange, CA (US)

(73) Assignee: Sharp Laboratories of America, Inc., Lamas, WA (US)

( * ) Notice: Subject to any disclaimer, the term of this patent is extended or adjusted under 35 U.S.C. 154(b) by 909 days.

(21) Appl. No.: 09/894,645

(22) Filed: Jun. 27, 2001

(65) Prior Publication Data

US 2003/0002068 A1  Jan. 2, 2003

(51) Int. Cl.
*G06K 1/00* (2006.01)
*H04N 1/00* (2006.01)
*G06F 7/00* (2006.01)

(52) U.S. Cl. .................. 358/1.15; 358/403; 707/1; 707/10

(58) Field of Classification Search ............... 358/1.15, 358/403; 707/1–10
See application file for complete search history.

(56) References Cited

U.S. PATENT DOCUMENTS

| | | | |
|---|---|---|---|
| 4,918,722 A | 4/1990 | Duehren et al. | |
| 5,129,016 A | 7/1992 | Murakami et al. | |
| 5,206,743 A | 4/1993 | Hochman et al. | |
| 5,384,835 A | 1/1995 | Wheeler et al. | |
| 5,659,164 A | 8/1997 | Schmid et al. | |
| 5,666,210 A * | 9/1997 | Yanai et al. | 358/402 |
| 5,920,404 A | 7/1999 | Weiser | |
| 5,978,560 A * | 11/1999 | Tan et al. | 358/1.15 |

FOREIGN PATENT DOCUMENTS

| | | | |
|---|---|---|---|
| JP | 02170642 A | | 7/1990 |
| JP | 05083513 A | | 4/1993 |
| JP | 06006563 | * | 1/1994 |

* cited by examiner

*Primary Examiner*—Jerome Grant
*Assistant Examiner*—Houshang Safaipour
(74) *Attorney, Agent, or Firm*—Law Office of Karen Dana Oster, LLC

(57) ABSTRACT

A method and apparatus for flexible control of the routing and processing of documents by a document receiver. Document classifications are defined by a receiver and stored on a registration server together with an associated document processing profile ("DPP"). The receiver communicates to a sender how to access his account on the registration server. The sender views the receiver's document classifications, selects one, and prints a cover page, which includes a document classification identifier. The sender scans the cover page and a source document with a digital scanner and transceiver. The document is sent to recipients and transformed according to the DPP.

12 Claims, 10 Drawing Sheets

USER: ACME, INC. ACCOUNT NO.: 514-503-768452

| PROFILES | PROFILE NUMBER |
|---|---|
| Engineering | 01 |
| Executive | 02 |
| Finance | 03 |
| Human Resources | 04 |
| Purchasing | 05 |

SEARCH   PRINT

DESCRIPTION   SUBCLASSIFICATIONS   END

| USER: ACME, INC. ACCOUNT NO.: 514-503-768452 | |
|---|---|
| PROFILES | PROFILE NUMBER |
| Resumes | 04-01-00 |
|    Executive | 04-01-01 |
|    Engineering | 04-01-02 |
|    Marketing | 04-01-03 |
|    Manufacturing | 04-01-04 |
| Requisitions | 04-03 |
| Benefits | 04-04 |
| Affirmative Action | 04-05 |

DESCRIPTION     PRINT     BACK

FIG. 4

PROFILE: Resumes - Engineering  04-01-02

| STEP | DESCRIPTION |
|------|-------------|
| 1.0 | Convert to text |
| 2.0 | Add date received |
| 3.0 | Find and index key words |
| 4.0 | If key word match, send copy to: |
| 4.1 |     Hardware Engineering group |
| 4.2 |     Software Engineering group |
| 4.3 |     Mechanical Engineering group |
| 5.0 | Send copy to EEOC database |
| 6.0 | Send copy to Central Resume Repository |
| 7.0 | Send confirmation to sender |

[MODIFY]  [PRINT]  [BACK]

METHOD OF ROUTING AND PROCESSING DOCUMENT IMAGES SENT USING A DIGITAL SCANNER AND TRANSCEIVER

BACKGROUND OF THE INVENTION

The present invention relates generally to a method and apparatus for routing and processing documents and specifically to a method and apparatus for defining document classifications and document processing profiles ("DPPs"), and for selecting, and using such document classifications and DPPs for routing and processing documents.

Recipients of documents generally have preferred practices and standards regarding the format, timing, routing, filing, indexing, storing, or other aspects of the documents they receive. For example, a recipient may know that a particular type of document is not of immediate interest but may be of future interest or may be of interest to another person. Accordingly, the recipient's practice may be to file or forward the document. Senders, however, are generally not privy to a recipient's preferences unless they make multiple contacts with the recipient to determine the preferences. This may be difficult, time-consuming, and annoying for both the sender and the recipient. Further, a recipient may not want the sender to have detailed knowledge of his preferences. For example, specific names of individuals to whom a document should be routed may be considered confidential.

U.S. Pat. No. 5,920,404 to Weiser ("the Weiser reference") discloses a system that allows an informed sender to control the routing of a message. Specifically, the Weiser reference discloses a method and system for controlling a messaging environment (i.e., computer network where files, documents, and other information are transferred from one apparatus or application to another) from a remote facsimile processor. The remote facsimile processor communicates with a network-attached facsimile processor via a conventional telephone network. The standard facsimile communication protocol uses a Transmit Station Identifier ("TSI") field that includes the telephone number of the sender and a textual identifier, such as the sender's name. Instead of the normal TSI information, the Weiser reference discloses that a user identifier and a predefined function code are placed in the TSI field. The user identifier is used to gain access to the messaging environment, and the function code is used to control processing within the messaging environment. A document or file may be faxed to the network-attached facsimile processor with instructions to route, store, print, or perform other functions. One problem with the Weiser system is that a sender must be "informed," i.e., have a system-assigned user identifier (i.e., sign-in number) and know the various function codes. Another problem is that there is no way for a recipient to control the routing. Further, use of the TSI field for an unintended purpose means that the information normally contained in the TSI field is truncated or omitted. This information may be important to a recipient.

U.S. Pat. No. 5,659,164 to Schmid, et al. ("the Schmid reference") discloses a method of digitally scanning information using a cover page to identify the beginning and end of a document as well as routing information. Specifically, the cover page contains routing information that includes an identifier for the individual to whom the document should be routed and may include scanner settings and an indication of additional operations (such as optical character recognition) to be performed. In use, the cover page is positioned as the first page in a set of pages, and the document is scanned. The Schmid reference discloses that only a single cover page is required for each user and that a specific cover sheet is not required for each document. This is a disadvantage for users who do not want to route and process all their documents in precisely the same manner. Further, because all routing and processing information is contained on the cover page, there is no convenient method for a document recipient to change the information. Instead, the recipient must retrieve the outdated cover pages from senders and distribute new ones, or documents will be routed and processed in an undesired manner.

U.S. Pat. No. 5,129,016 to Murakami, et al. ("the Murakami reference") discloses a system and method for registration of scanned documents. The system includes registration data and document image databases. For each document to be scanned, a header sheet is prepared. The header sheet contains symbols representing the number of sheets, the document number, class, and type (such as book type or tab type). A trailer sheet containing a symbol representing the end of the entry is also prepared for each document. The symbols on the sheets may be recognized by a character recognition unit. To facilitate searching, registration data (such as key words, bibliographic information, document number, and class) is manually input for each document. The system disclosed in the Murakami reference is limited to storing a document in a database. A user who wants to send the document to another person or process the document is unable to do so with this system.

U.S. Pat. No. 5,384,835 to Wheeler, et al. ("the Wheeler reference") is directed to a centralized image-processing system incorporated into a public telephone network that users access from a facsimile machine, scanner, workstation, or LAN. The Wheeler reference is limited to a shared platform distributed through a telephone system. No provision is made for satisfying the receiver's specific needs.

Facsimile machines are one common method used for sending paper documents. With facsimile technology, an electronic image of a paper document may be sent to another location. The need to deliver a separate physical copy of the paper document is eliminated because the facsimile machine creates a paper document. If the facsimile machine has memory or is capable of communicating with a computer or other device with memory, the electronic image of the document may be stored in memory without the need to print and store a paper document. Other devices have evolved to perform facsimile machine functions. A personal computer, document scanner, and printer working together can perform the functions of a facsimile machine. Further, a network-enabled digital copier may perform the functions of a facsimile machine. In addition, other devices or combinations of devices may perform the functions of a facsimile machine. In this document, the term "digital scanner and transceiver" denotes a facsimile machine, a combined computer-scanner-printer, a network-enabled digital copier, or any other device or combination of devices capable of performing the functions of a facsimile machine.

BRIEF SUMMARY OF THE INVENTION

Known solutions for automating document routing and processing are either controlled by an informed sender or are only rigidly controlled by a document recipient. In the solution that permits control by a document recipient, every document received is routed and processed in an identical manner.

The present invention is directed to a flexible method and apparatus for control of the routing and processing of documents by a document receiver. The sender need not know how the receiver classifies the document sent to him or anything about how the receiver intends to route or process the document. The document receiver may easily establish and change document classifications and document routing and processing instructions.

Specifically, the present invention is directed to a method and apparatus for defining, selecting, and using a predefined DPP for routing and processing classes of documents. Each document classification is defined by a receiver and stored on a registration server together with an associated DPP. The receiver communicates to a sender how to access his account on the registration server.

In one preferred embodiment, the sender is then capable of viewing the receiver's document classifications. The sender selects a document classification and prints a cover page, which includes a document classification identifier. The sender scans the cover page and a source document with a digital scanner and transceiver. The document is sent to recipients and transformed according to the DPP specified by the receiver.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 2 is an exemplary screen view of a list of document classifications and document-sender action selections in one preferred embodiment of the present invention.

FIG. 3 is an exemplary screen view of a list of document subclassifications and document-sender action selections in one preferred embodiment of the present invention.

FIG. 4 is an exemplary screen view of a list of steps in a DPP and document receiver action selections in one preferred embodiment of the present invention.

DETAILED DESCRIPTION OF THE INVENTION

The present invention relates generally to a method and apparatus for routing and processing documents and specifically to a method and apparatus for defining document classifications and DPPs, and for selecting and using such document classifications and DPPs for routing and processing documents. A receiver initiates a session with a registration server, sets up an account, and establishes a classification for each type of document that he anticipates receiving. A set of processing steps for each classification is input or selected by the receiver. The receiver communicates to a sender his name or account number. The sender initiates a session with the registration server, selects the receiver name or account number, and selects a document classification. The sender prints a cover page, which includes a document classification identifier, and scans the cover page and a source document with a digital scanner and transceiver (defined in the Background of the Invention). The document is sent to recipients and transformed according to the DPP specified by the receiver.

As used herein, "document" means any object that embodies textual or graphic information. A document may be a physical object, such as a letter, or a virtual physical object, such as the image of an e-mail message or Web page displayed on a computer screen. Examples of documents include photographs, memorandums, computer files, invoices, advertisements, books, magazines, medical records, insurance records, and other similar objects. A physical document may be stored as a virtual physical document in a computer memory by various means, such as scanning the document. A document may be created as a virtual physical document using software (such as a word-processing program) and transformed into a physical document by various means, such as by printing. The term "source document" refers to a document that a sender wishes to send to a receiver using the present invention.

Figure 10A:
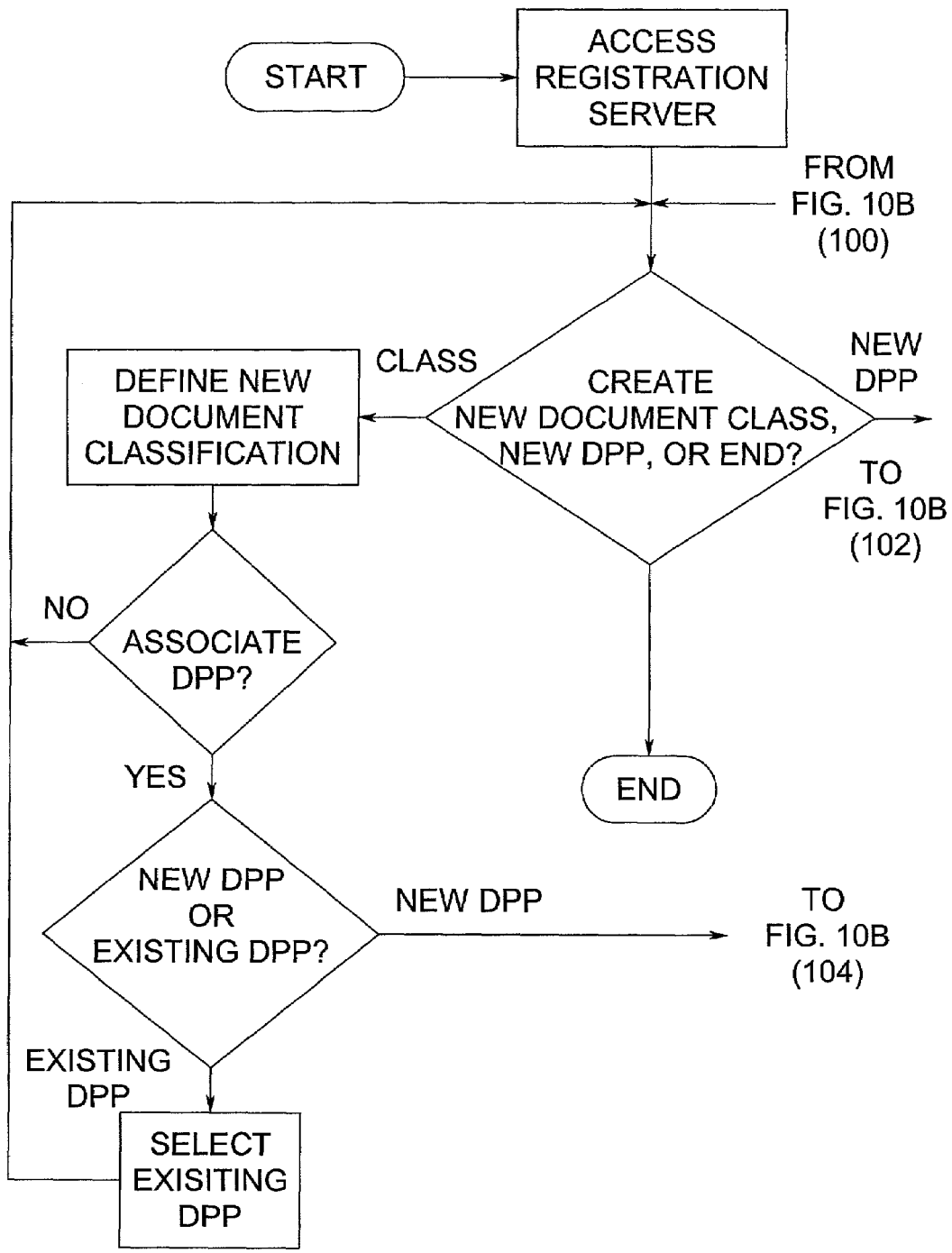
FIGS. 10A and 10B are flow diagrams of an exemplary embodiment of the present invention illustrating a method of creating a document classification and DPP.

As used herein, "document classification" means a receiver-defined type, category, or class of documents. For example, a receiver that is an individual may classify documents that he anticipates receiving as either personal or work-related. As another example, a receiver that is an organization may classify documents it anticipates receiving according to type of product or service, type of communication, or other characteristic. An unlimited number of classifications are possible, and a receiver can have as many or as few classes as he desires. Further, a receiver can further define classifications for documents that he anticipates receiving in any way he chooses. For example, an organizational receiver can define classifications (such as by division, department, and employee) and subclassifications (such as correspondence, invoices, resumes, responses to promotions, solicitations, and complaints). FIG. 10A shows an exemplary method for creating a document classification.

A DPP may consist of a single step, such as storing a document in a designated folder on a designated computer. Alternatively, a DPP may include many steps. Examples of possible processing steps include storing the document in memory, storing a copy in a second memory, storing a copy in a database, sending a copy to another person, printing a copy, sending a confirmation message indicating that the document was received, creating index entries for the document based on the words appearing in the document, requiring that a document be encrypted before sending, requiring that a document be sent in a standard document format (such as PDF, JPEG2000, or TIFF), converting the scanned image of a document to a text document using optical character recognition techniques, requiring that a document be scanned using predetermined copier settings (such as brightness, contrast, resolution, graphic, text, or combined graphic and text image), requiring that a document be sent using a particular type of Web service (such as e-mail, HTTP, or FTP), requiring that a document be sent from a specified network address, requiring that a digital watermark be placed in a document, requiring that a document be sent only if a document, or invoice number is entered, requiring that a document be sent only if a password or public encryption key is entered, requiring that a document be retransmitted (at least once or up to a specified number of times) if the transmission fails, or destroying the document. These examples illustrate possible processing steps that may be included in a DPP and the present invention contemplates any other processing step that can be performed on a document.

Figure 9:
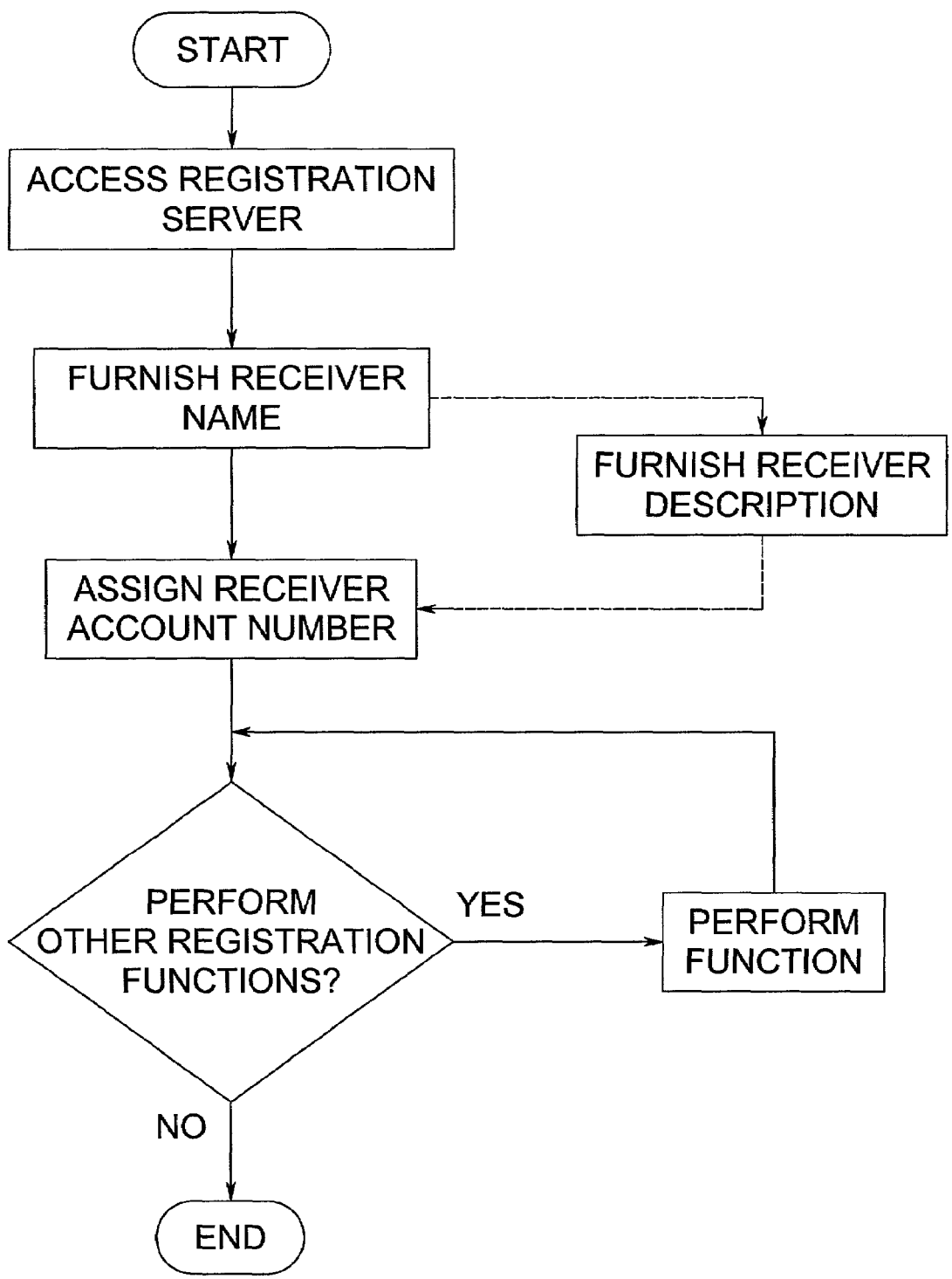
FIG. 9 is a flow diagram of an exemplary embodiment of the present invention illustrating a method of establishing an account for a receiver with a registration server.

Initially, as shown in FIG. 9, a receiver establishes an account with a registration server by furnishing a receiver name and an optional description. The receiver description preferably includes attributes such as the receiver's address, e-mail address, telephone number, employee number, birth date, or any other relevant information that may be used for identification, searching, or other purposes. It should be noted that the receiver may be a corporation or other entity. In such a case, the corporation could have a single account or multiple accounts. If there are multiple accounts, they may be interconnected. The receiver description for a corporation may include, for example, a corporate address and telephone number, a contact e-mail address, and other relevant information. If multiple accounts are used, individuals may have additional individual receiver descriptions. The receiver is assigned a unique account number or identifier by the registration server. Optionally, the receiver may be assigned a password.

Figure 1:
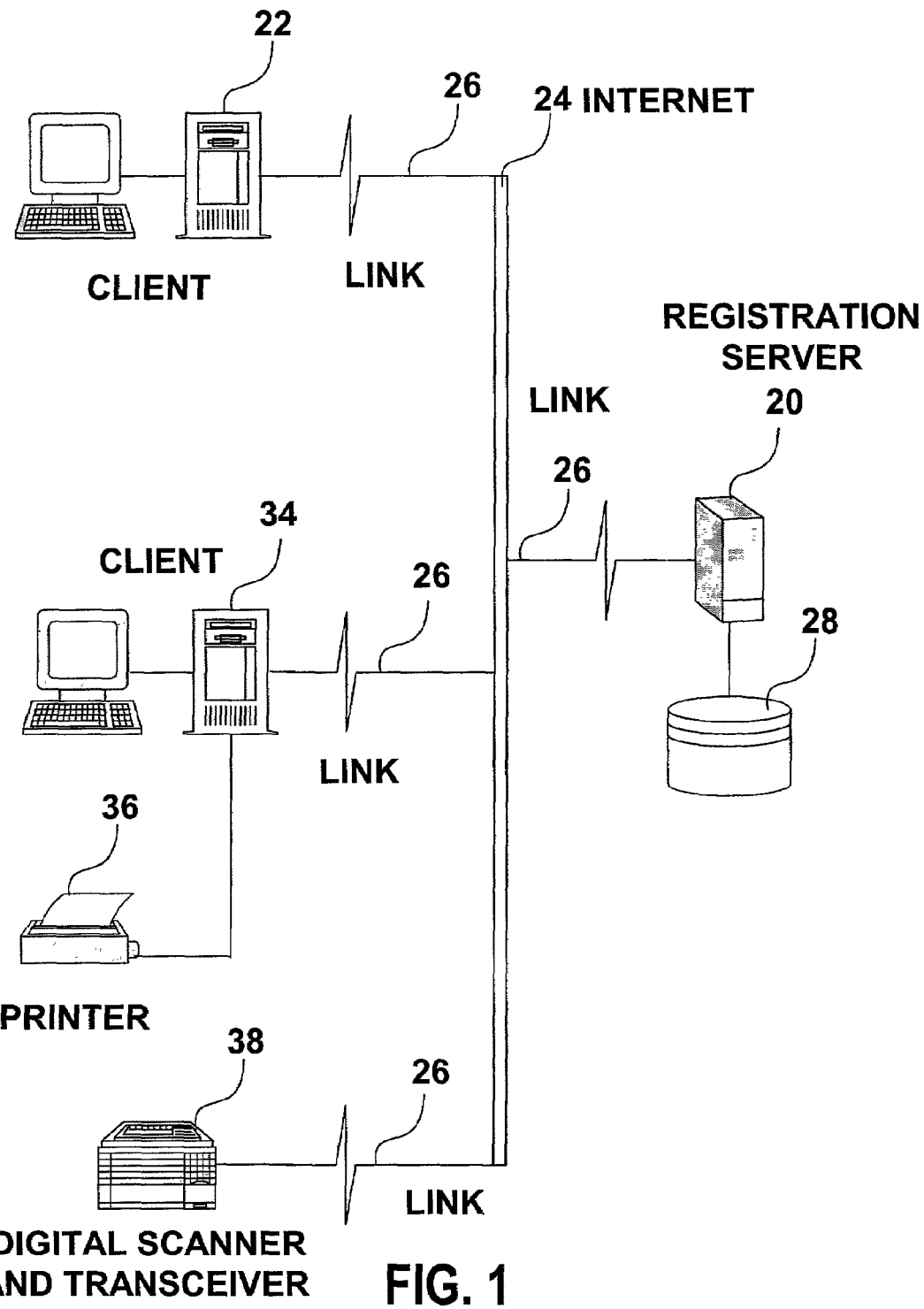
FIG. 1 is a block diagram of one representative embodiment of the present invention having a registration server, a document-receiver client, a document-sender client, and a digital scanner and transceiver.
Figure 5:
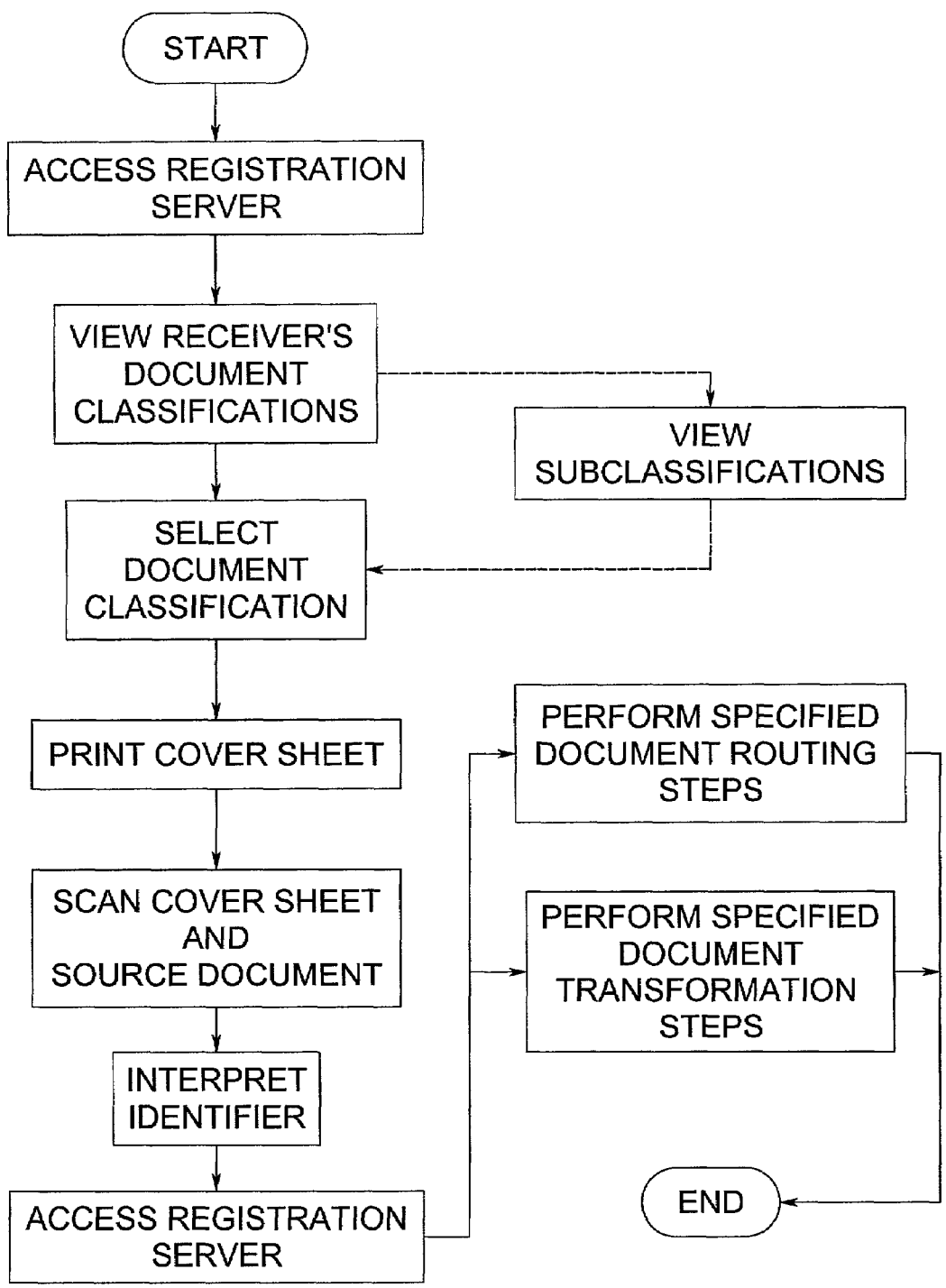
FIG. 5 is a flow diagram of an exemplary embodiment of the present invention, illustrating a method of selecting a document classification and sending and processing a source document according to the selected document classification.
Figure 8:
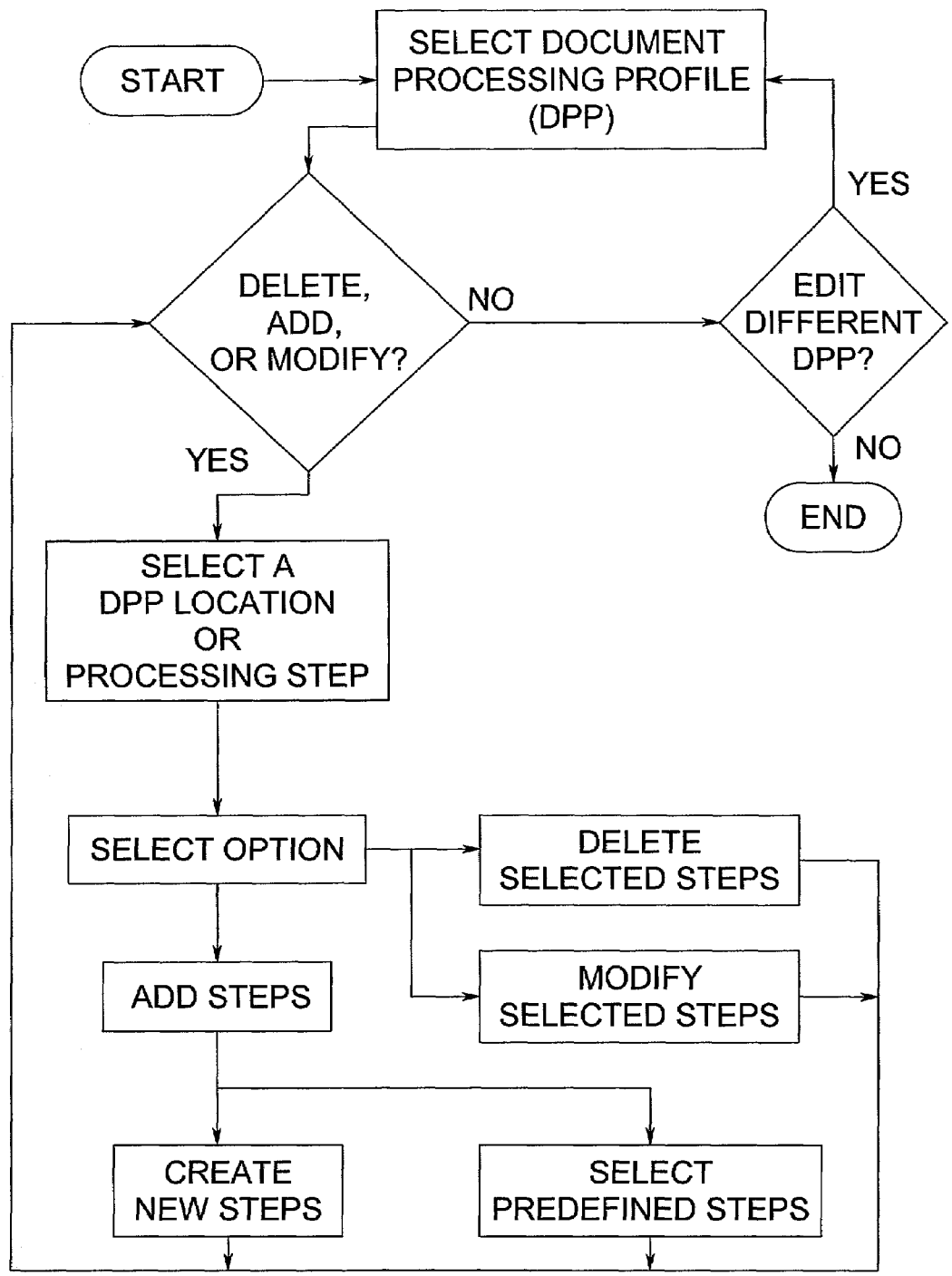
FIG. 8 is a flow diagram of an exemplary embodiment of the present invention illustrating a method of deleting, changing, or making additions to a DPP.
Figure 10B:
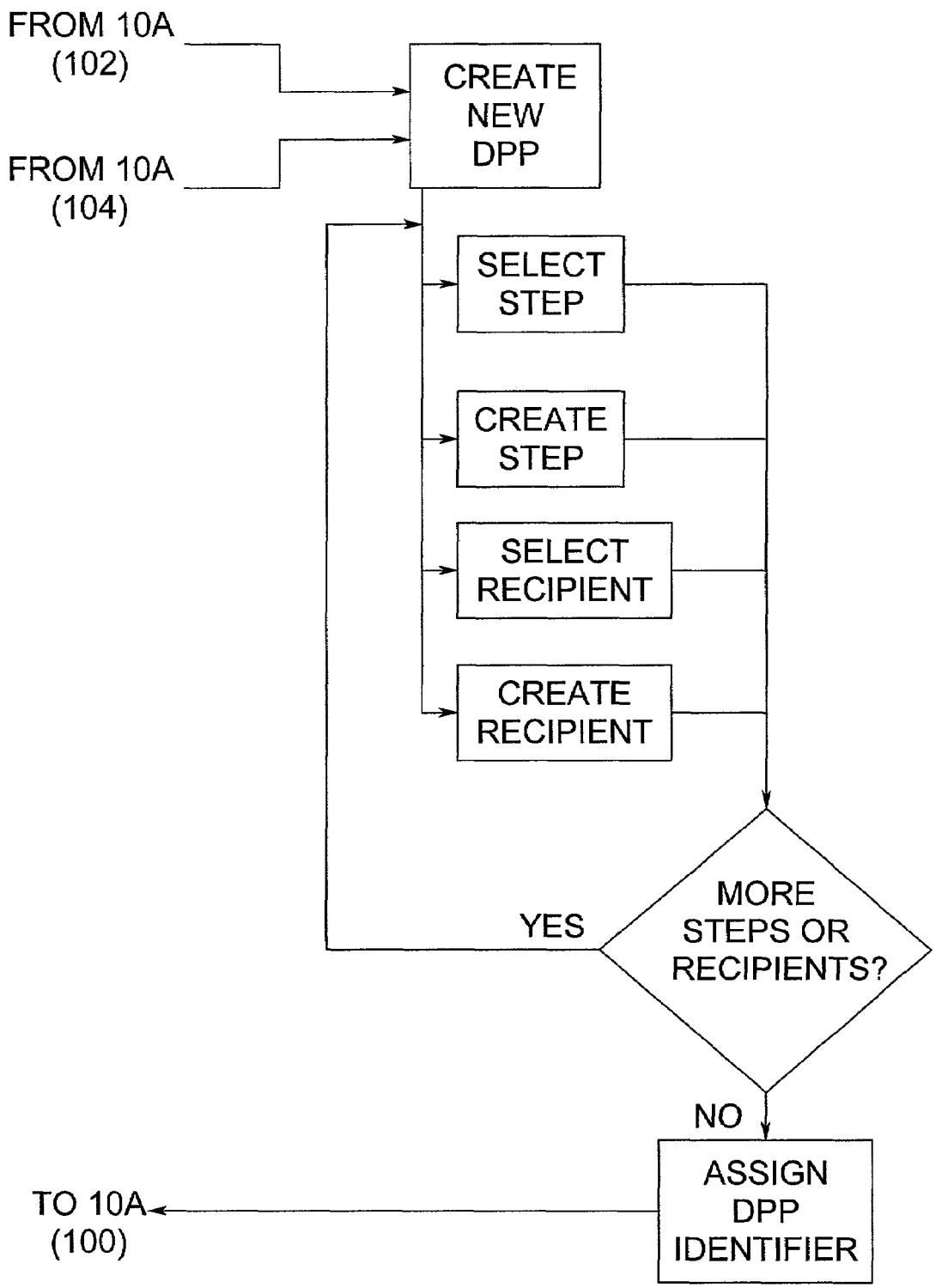

After establishing an account, the receiver defines at least one document classification and enters or selects at least one processing step. An exemplary method for defining a document classification and DPP is shown in FIGS. 10A and 10B. Processing steps may be created or selected from a predefined list. After all processing steps have been entered or selected, the receiver stores the processing steps as a DPP in a memory 28 associated with the registration server 20 as shown in FIG. 1. The registration server assigns each DPP a unique DPP identifier. A DPP is associated with each document classification that a receiver anticipates receiving. As shown in FIGS. 10A and 10B, a receiver may associate a newly defined or existing DPP with a document classification. FIG. 4 shows an exemplary DPP description display screen 32 that is available for viewing by a receiver after a DPP has been created. As shown, a processing step may be conditional. For example, a resume would be routed to the manager of the Software Engineering Group only if specified words or phrases such as "C++," "Visual Basic," "Java," "HTML," or "Windows" appeared. In a preferred embodiment, the DPP can be supplemented, modified, or deleted quickly and efficiently so that it is always current. FIG. 8 shows an exemplary method for deleting, changing, or making additions to a DPP.

After defining document classifications and establishing DPPs, a receiver provides a sender with information such as his name, a Web site URL, account identifier, or one or more document classification identifiers. The receiver may communicate this information using any convenient method, such as in printed media, by e-mail, facsimile, or orally. In one alternative preferred embodiment, a sender performs a search using known keywords, such as receiver name, address, telephone number, line of business, or industry to locate the receiver's account on the registration server. In addition, the information may be publicly disseminated in advertisements or on a Web site.

Using a system such as that shown in FIG. 1, a receiver initiates a session with a registration server 20 using a document-receiver client 22. The server 20, document-receiver client 22, document-sender client 34, and digital scanner and transceiver 38 may communicate using any known computer-to-computer communication network or software, such as a LAN, WAN with TCP/IP Web browser, e-mail, FTP, application specific software, and protocols, or other similar network or software. In the shown embodiment, the registration server 20, clients 22 and 34, and digital scanner and transceiver 38 are connected to the Internet 24 through appropriate transmission links 26, such as a dial-up connection, a broadband connection, a LAN gateway, a bridge, a router, or other similar means. In an alternative preferred embodiment, registration server 20 and clients 22 and 34 communicate via the Internet 24 using a Web browser. The registration server 20 may be a Web server dedicated to handling registrations, or it may be a component of a digital scanner and transceiver 38 attached to a local network (such as a WAN or LAN). The registration server 20 may handle registrations for any receiver or only for designated receivers, such as specified users of a local network.

A sender communicates with the registration server 20 using a client 34 with attached printer 36. In one preferred embodiment, the sender establishes an account with the registration server 20 prior to initiating a session. Registration may include the sender's providing identifying information such as an address, e-mail address, telephone number, employee number, birth date, or any other relevant information that may be used for identification or other purposes. In this embodiment, the sender is assigned a unique sender account identifier by the registration server 20. Optionally, the sender may also be assigned a password. In an alternative preferred embodiment, the sender can initiate a session with the registration server 20 without the need to establish an account.

The sender accesses the receiver's document classification information by selecting the receiver's name or account identifier that was communicated by the receiver to the sender. As shown in FIGS. 2 and 3, document classification information may be displayed as a list of the receiver's general document classifications. FIG. 2 shows an exemplary document classification display screen 30 having exemplary classifications that might be created by an organizational receiver. In an exemplary method for viewing a document subclassification, a receiver chooses the desired general classification (such as "Human Resources") and selects the "subclassification" element. FIG. 3 shows an exemplary document classification display screen 31 having exemplary subclassifications that might be created by an organization for an exemplary human resources general classification. A description of the document classification (such as, for example, "Use this subclassification if you wish to have your resume considered for hardware or software engineering positions. If you wish to have your resume considered for engineering management positions, do not use this classification; use the "Executive" classification instead.") may optionally be accessible to the sender by selecting the "description" element.

In one exemplary preferred embodiment, the sender selects the most appropriate classification or subclassification from a list such as those shown in FIGS. 2 and 3. In an alternative embodiment, the desired classification or subclassification is found or provided and then entered. In another alternative embodiment, the sender knows the document classification and enters it. In an additional alternative embodiment, a sender may perform a "key word" or other search to find the most appropriate classification. This alternative is particularly beneficial if the receiver has a large number of classifications.

Figure 6:
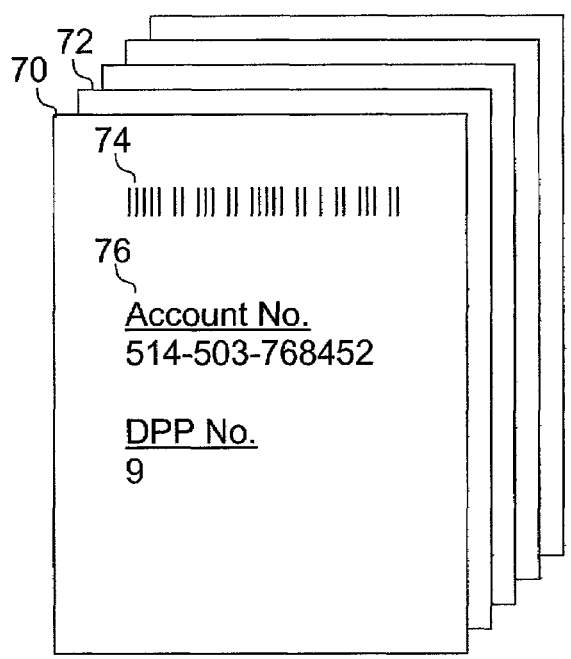
FIG. 6 illustrates a cover page with machine- and human-readable document classification identifiers printed thereon of an exemplary embodiment of the present invention and a source document.

As shown in FIG. 6, the sender prints a cover page 70 for an appropriate classification or subclassification using printer 36. The cover page 70 preferably includes a machine-readable document classification identifier 74 for the selected classification. In one exemplary preferred embodiment, the document classification identifier is a barcode. Alternatively, the document classification identifier is human-readable information 76. In one preferred embodiment, the human-readable document classification identifier 76 is converted by the digital scanner and transceiver 38 so as to be understood by the system. In one preferred embodiment, document classification identifier 76 is converted to a system-understood document classification identifier using known optical character-recognition techniques. Exemplary information encoded in the document classification identifier may be the network address of the registration server where the receiver's DPP are stored, the receiver's account number, information linking the document classification to a DPP, or the actual DPP.

Figure 7:
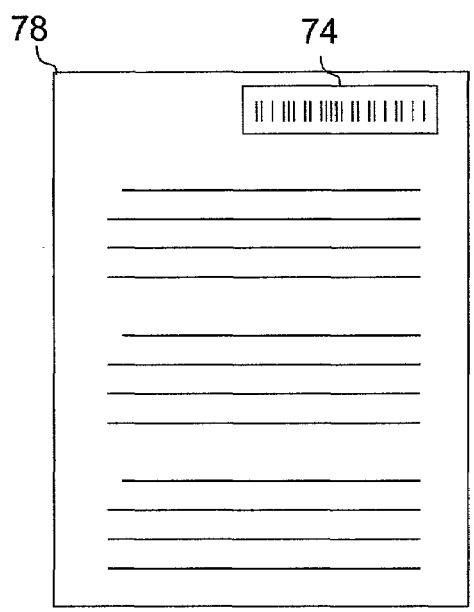
FIG. 7 illustrates a first page of a source document with a machine-readable document classification identifier affixed thereon according to an exemplary embodiment of the present invention.

As shown in FIG. 7, the cover page may be replaced by a label 74 (containing a document classification identifier) that is affixed to the first page of a source document 78. Alternatively, the document classification identifier may be created electronically (using, for example, client 34 or digital scanner and transceiver 38) and associated with or incorporated into (generally at the beginning) the source document. These and other alternatives are used synonymously.

Using a digital scanner and transceiver 38, the sender scans the cover page 70. As shown in FIG. 6, immediately following the cover page 70, the source document 72 the sender wishes to send to the receiver is scanned. In one preferred embodiment, the digital scanner and transceiver 38 reads and decodes the document classification identifier, determines the document destination from the information in the document classification identifier, and initiates a session with the registration server 20. The registration server 20 locates the DPP in its memory 28 and transmits any relevant "conditional" instructions to the digital scanner and transceiver 38. For example, conditional instructions may include requiring predetermined copier settings, use of a particular type of Web service, requiring the sender to enter meta-data such as invoice number, or entry of a password or encryption key by the sender. In one exemplary preferred embodiment, the digital scanner and transceiver 38 may transmit a message indicating that it is unable to perform the requested conditional instruction to which the registration server 20 may respond with an alternative instruction, waive the instruction, or refuse to accept the document. In an alternative preferred embodiment, conditional instructions are not transmitted by the registration server 20, and only an instruction that the scanned document should be uploaded to the registration server 20 is transmitted. The conditional instructions mentioned are exemplary, and other instructions may be transmitted before a document is uploaded.

After performance of any conditional instructions, the document is uploaded to the registration server 20 and routed electronically to all locations and recipients specified in the DPP. In addition, any document transformation steps specified in the DPP are performed. In one preferred embodiment, document transformation steps are performed on the registration server 20. In an alternative preferred embodiment, document transformation steps are performed on the client 22. In an additional exemplary preferred embodiment, document transformation steps are performed on the digital scanner and transceiver 38. In other embodiments, document transformation steps are performed where specified in the processing steps or based on the capabilities and capacity of the respective network devices.

The method of the present invention would be particularly useful, for example, in a large company with multiple departments. The company could set up an account with classifications including accounting, sales, purchasing, human resources, and customer service. The classifications may be divided into subclassifications. For example, the purchasing classification may be divided into subclassifications, such as solicitations, quotes, confirmation of orders, and invoices. The Human Resources classification could also be subclassified into subclassifications for each technology or each department. A supplier might send a special-offer advertisement to the solicitations subclassification. According to the DPP, the advertisement may be routed to all the company's purchasing agents, stored for future reference, or sent to prevent overcharges, and if the advertisement offers a price reduction of more than 20 percent, it may be included in a company bulletin for dissemination to all employees who might want to pass it on to customers. A job-seeker might send a resume to the small appliance sales group subclassification of the human resources classification. According to the DPP, an appropriate letter may be generated and sent to the job-seeker, the resume may be routed to the appropriate human resource employees and to hiring managers of the small appliance sales group, and the resume may be stored for future reference. If one of the human resources employees is working from home, the resume could automatically be forwarded by changing the DPP. Similarly, if one of the routing recipients has been replaced, changing the DPP would ensure that the resume was correctly routed.

As another example, the present invention may be used by a business traveler to conveniently access his company's internal network environment. For example, the traveler sender may use his laptop computer, cellular telephone, or personal digital assistant ("PDA") to access the registration server 20. Using a laptop computer, a cellular telephone, or PDA, the sender can print (using a Bluetooth-enabled or conventional printer in communication with his laptop computer, telephone, or PDA) a cover sheet containing the document classification identifier necessary to route the document (such as a contract, purchase order, or article) to desired locations, including to himself as a receiver. Further, the DPP may include converting the document into an image file format different from the scanned image file format (such as PDF, TIFF, BMP or PCX) for convenient long-term storage, indexing by a search engine, or into a text file for easy manipulation by a word-processing program.

As an additional example, the present invention would be useful for transmitting and processing medical and medical insurance records. A health maintenance organization ("HMO") could set up an account with classifications for consumer and health care provider documents. Consumer subclassifications could be established for health care plan options, groups, regions, and other subcategories further defining offered health care plans and options. Health care provider subclassifications could be established for hospitals, physicians, dentists, medical specialists (such as, for example, orthodontists, oncologists, surgeons, and orthopedists), pharmaceutical suppliers, and other providers. In addition, health care providers could establish accounts as receivers. A consumer could access an HMO's account on the registration server to obtain the appropriate document classification identifier needed to process an insurance claim form. The consumer could conveniently submit forms to the HMO (related to claims, or beneficiary, plan, or address changes, for example). Moreover, health care providers could submit invoices and required forms to HMOs in a manner similar to that described for consumers. As specified in a DPP, claim forms could be electronically routed to claim processing and payment areas of the HMO. In addition, an HMO may stipulate that an expensive or extraordinary procedure will be covered only if the HMO has given its prior approval. Appropriate prior approval forms could be directed to special document subclassifications so that such claims could be promptly and efficiently routed to appropriate review personnel within the HMO. Further, an HMO may require that printed or graphic results of medical tests (such as x-ray or EKG test results) be forwarded as part of the claim processing or procedure preapproval process. The HMO could establish document subclassifications with appropriate DPPs to expeditiously route and process such documents. In addition, it is frequently necessary to send medical test results from one health care provider to another. A specialist will require copies of a generalist's evaluation, including the patient's historical medical records. After the specialist completes his tests and evaluation, the generalist will want a copy of the specialist's report and test results. Using the present invention, results of medical tests could easily be sent between health care providers. For example, a generalist physician may establish a DPP that routes copies of the specialist's report and tests results to himself for review, to an HMO (to an HMO-defined document classification), and to a patient's medical history file. Moreover, DPPs could require conditional instructions related to the confidential nature of medical records, such as encryption or the use of passwords. Additionally, the ease with which DPPs may be changed would be particularly advantageous in the medical and medical insurance record context because health care plans and procedures are subject to frequent revisions.

The user interfaces described are exemplary, and as will be appreciated by one skilled in the art, many alternative interfaces are possible and may be employed. The individual elements of the system are also exemplary. For example, a client or sender may be a cellular telephone, PDA, computer, or other computing or communications device. Further, the order of the steps is meant to be exemplary.

The terms and expressions that have been employed in the foregoing specification are used as terms of description, not of limitation, and are not intended to exclude equivalents of the features shown and described or portions of them. The scope of the invention is defined and limited only by the claims that follow.

What is claimed is:

1. A receiver controlled method for processing at least one document, said method comprising the steps of:
   (a) providing at least one processing step to be performed on said at least one document;
   (b) providing at least one document classification to be associated with an at least one document processing profile;
   (c) creating said at least one document processing profile by associating at least one of said at least one processing steps therewith;
   (d) associating each at least one document classification with one of said at least one document processing profile;
   (e) assigning a document classification identifier to each said at least one document classification;
   (f) providing access to at least one document classification identifier to a sender, said sender printing said at least one document classification identifier on a document to be sent as a sent document using a digital scanner and transceiver;
   (g) receiving said sent document with said at least one document classification identifier printed thereon;
   (h) reading and decoding said at least one document classification identifier on said sent document; and
   (i) processing said sent document according to processing steps associated with said at least one document classification identifier.

2. The method of claim 1, wherein said at least one processing step is a predefined step.

3. The method of claim 1, wherein said at least one processing step is a step defined by said receiver.

4. The method of claim 1, wherein said at least one processing step is selected from a group consisting of:
   (a) storing a printed copy of said document in a document file;
   (b) storing said document in a memory;
   (c) storing a copy of said document in a second memory;
   (d) sending a copy of said document to another recipient;
   (e) printing said document;
   (f) sending a confirmation message to the sender of said document;
   (g) converting an image of said document into a text document;
   (h) searching a text document for key words;
   (i) creating index entries for said document;
   (j) requiring that said document be encrypted;
   (k) decoding an encrypted document;
   (l) requiring that said document be sent in a specified format;
   (m) requiring the use of specified scanner settings;
   (n) requiring transmission of said document using a specified method;
   (o) requiring that said document be sent from a specified location;
   (p) requiring that said document identifier be entered before transmission of said document;
   (q) requiring that a password be entered before transmission of said document;
   (r) requiring that a public encryption key be entered before transmission of said document;
   (s) requiring that a document be retransmitted if a transmission fails; and
   (t) requiring that a digital watermark be placed in a document.

5. The method of claim 1, wherein said step of processing said sent document according to processing steps associated with said at least one document classification identifier further comprises the step of routing said sent document according to processing steps associated with said at least one document classification identifier.

6. The method of claim 1, wherein said step of processing said sent document according to processing steps associated with said at least one document classification identifier further comprises the step of transforming said sent document according to processing steps associated with said at least one document classification identifier.

7. A receiver controlled method for processing at least one document, said method comprising the steps of:
(a) at a receiver:
   (i) providing at least one processing step to be performed on said at least one document;
   (ii) providing at least one document classification to be associated with an at least one document processing profile;
   (iii) creating said at least one document processing profile by associating at least one of said at least one processing steps therewith;
   (iv) associating each at least one document classification with one of said at least one document processing profile;
   (v) assigning a document classification identifier to each said at least one document classification;
   (vi) providing access to at least one document classification identifier to a sender;
(b) said sender incorporating said at least one document classification identifier with a document to be sent as a sent document using a digital scanner and transceiver;
(c) at said receiver:
   (i) receiving said sent document with said at least one document classification identifier printed thereon;
   (ii) reading and decoding said at least one document classification identifier on said sent document; and
   (iii) processing said sent document according to processing steps associated with said at least one document classification identifier.

8. The method of claim 7, wherein said at least one processing step is a predefined step.

9. The method of claim 7, wherein said at least one processing step is a step defined by said receiver.

10. The method of claim 7, wherein said at least one processing step is selected from a group consisting of:
(a) storing a printed copy of said document in a document file;
(b) storing said document in a memory;
(c) storing a copy of said document in a second memory;
(d) sending a copy of said document to another recipient;
(e) printing said document;
(f) sending a confirmation message to the sender of said document;
(g) converting an image of said document into a text document;
(h) searching a text document for key words;
(i) creating index entries for said document;
(j) requiring that said document be encrypted;
(k) decoding an encrypted document;
(l) requiring that said document be sent in a specified format;
(m) requiring the use of specified scanner settings;
(n) requiring transmission of said document using a specified method;
(o) requiring that said document be sent from a specified location;
(p) requiring that said document identifier be entered before transmission of said document;
(q) requiring that a password be entered before transmission of said document;
(r) requiring that a public encryption key be entered before transmission of said document;
(s) requiring that a document be retransmitted if a transmission fails; and
(t) requiring that a digital watermark be placed in a document.

11. The method of claim 7, wherein said step of processing said sent document according to processing steps associated with said at least one document classification identifier further comprises the step of routing said sent document according to processing steps associated with said at least one document classification identifier.

12. The method of claim 7, wherein said step of processing said sent document according to processing steps associated with said at least one document classification identifier further comprises the step of transforming said sent document according to processing steps associated with said at least one document classification identifier.

* * * * *